(12) United States Patent
LeBlanc et al.

(10) Patent No.: US 12,036,742 B2
(45) Date of Patent: Jul. 16, 2024

(54) OPTIMIZED ADDITIVE MANUFACTURING

(71) Applicant: GM GLOBAL TECHNOLOGY OPERATIONS LLC, Detroit, MI (US)

(72) Inventors: Benjamin John LeBlanc, Ortonville, MI (US); Adam John Campbell, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 206 days.

(21) Appl. No.: 17/804,876

(22) Filed: Jun. 1, 2022

(65) Prior Publication Data

US 2023/0391011 A1    Dec. 7, 2023

(51) Int. Cl.
*B29C 64/386* (2017.01)
*B22F 10/85* (2021.01)
*B33Y 30/00* (2015.01)
*B33Y 50/00* (2015.01)
*G05B 19/4099* (2006.01)

(52) U.S. Cl.
CPC ............ *B29C 64/386* (2017.08); *B22F 10/85* (2021.01); *B33Y 50/00* (2014.12); *G05B 19/4099* (2013.01); *B33Y 30/00* (2014.12); *G05B 2219/49023* (2013.01)

(58) Field of Classification Search
CPC ....... B29C 64/386; B33Y 50/00; B33Y 30/00; B22F 10/85; G05B 19/4099; G05B 2219/49023
See application file for complete search history.

(56) References Cited

U.S. PATENT DOCUMENTS

| | | | |
|---|---|---|---|
| 11,338,521 B2 | 5/2022 | Zeng et al. | |
| 2016/0001509 A1* | 1/2016 | Long | B29C 64/153 219/76.1 |
| 2017/0252978 A1 | 9/2017 | Claes | |
| 2020/0198250 A1* | 6/2020 | Shitrit | B33Y 70/10 |
| 2020/0223148 A1* | 7/2020 | Huang | B33Y 10/00 |
| 2021/0331405 A1 | 10/2021 | Martinez et al. | |

* cited by examiner

*Primary Examiner* — Robert E Fennema
*Assistant Examiner* — Yvonne Trang Follansbee
(74) *Attorney, Agent, or Firm* — Lorenz & Kopf LLP (57) ABSTRACT

Methods and systems for additive manufacturing are provided. An exemplary method includes calculating a slice area distribution of a desired 3D design including slice areas of slices of the desired design, wherein the slices have an initial slice area differential. The method further includes obtaining a slice area distribution of a sacrificial 3D design comprising slice areas of slices of the sacrificial design. The method includes planning a 3D layout of the desired and sacrificial design, wherein at each respective parallel plane in the layout a total slice area includes a respective slice area of the desired design and a respective slice area of the sacrificial design, and wherein the layout has a total slice area differential that is less than the initial slice area differential. Also, the method includes generating instructions for printing slices of the desired design and the sacrificial design according to the layout.

16 Claims, 6 Drawing Sheets

OPTIMIZED ADDITIVE MANUFACTURING

INTRODUCTION

The technical field of this disclosure relates generally to additive manufacturing or three-dimensional (3D) printing processes and, more particularly, to layer by layer building of articles.

Methods of additive manufacturing may involve building objects on a layer by layer basis. Depending on the distribution and orientation of the object(s) to be built, the area of an object to be built for one layer (e.g., area per height) may be different (e.g., larger or smaller) than the area of the object to be built for a different layer. These areas of an object to be built at a particular layer may be referred to as a slice area.

Because the size of slice areas may vary greatly across different layers, the building time (e.g., scanning time) at a particular layer may also vary greatly from the building time at other layers. For example, a layer with a large area of the object to be built may be, for example, require a building time that is much longer than the building time at a different layer that has a relatively small area of the object to be built. The longer building time at a particular layer can lead to greater heat generation at the layer, which can lead to issues in the build quality across layers. For example, the differences in heat generation for different layers can cause different levels of shrinkage for the different layers, thus leading to uneven builds and quality. In addition, the differences in building time for different layers can result in different densities of the materials at the different layers, color differences on the object surface, and bad surface quality of the object. Further, the dimensions of the object may not come out as expected due to the differences in building time for the different layers.

Accordingly, it is desirable to provide methods and systems for decreasing the building time differential between layers for improved building of the objects using additive manufacturing techniques. Furthermore, other desirable features and characteristics will become apparent from the subsequent detailed description and the appended claims, taken in conjunction with the accompanying drawings and the foregoing technical field and background.

SUMMARY

Methods and systems for additive manufacturing are provided.

A method for additive manufacturing includes calculating, on a computing device, a slice area distribution of a desired three-dimensional (3D) design including slice areas of slices of the desired 3D design corresponding to parallel planes along an axis, wherein the slices of the desired 3D design have an initial slice area differential. Further, the method includes obtaining, on the computing device, a slice area distribution of a sacrificial 3D design including slice areas of slices of the sacrificial 3D design corresponding to the parallel planes. Also, the method includes planning, on the computing device, a 3D layout of the desired 3D design and of the sacrificial 3D design, wherein at each respective parallel plane in the 3D layout a total slice area includes a respective slice area of the desired 3D design and a respective slice area of the sacrificial 3D design, and wherein the 3D layout has a total slice area differential that is less than the initial slice area differential. Moreover, the method includes generating instructions, with the computing device, for printing slices of the desired 3D design and the sacrificial 3D design according to the 3D layout.

In certain embodiments, the method further includes communicating the instructions from the computing device to an additive manufacturing apparatus and printing slices of the desired 3D design and the sacrificial 3D design according to the 3D layout to form the desired 3D design and the sacrificial 3D design.

In certain embodiments of the method, the 3D layout includes a plurality of articles with the desired 3D design and a plurality of articles with the sacrificial 3D design.

In certain embodiments of the method, the 3D layout consists of a plurality of articles with the desired 3D design and a plurality of articles with the sacrificial 3D design.

In certain embodiments of the method, the sacrificial 3D design is a first sacrificial 3D design; the method further includes obtaining, on the computing device, a slice area distribution of a second sacrificial 3D design including slice areas of slices of the second sacrificial 3D design corresponding to the parallel planes; and planning the 3D layout includes planning the 3D layout of the desired 3D design, of the first sacrificial 3D design, and of the second sacrificial 3D design, wherein at each respective parallel plane in the 3D layout a total slice area includes a respective slice area of the desired 3D design, a respective slice area of the first sacrificial 3D design, and a respective slice area of the second sacrificial 3D design. In such embodiments, the 3D layout may consist of a plurality of articles with the desired 3D design, a plurality of articles with the first sacrificial 3D design, and a plurality of articles with the second sacrificial 3D design.

In certain embodiments of the method, the sacrificial 3D design has a linear change in slice areas between adjacent slices.

In certain embodiments of the method, the sacrificial 3D design is formed with a curve defined by coordinates (x,y) according to the formula: $x*A=\pi*[(y-h)/m]^2$ wherein: $0<x<1$; A is a hemispherical cross sectional area and $0<A$; m is a slope and $m<0$; and h is height and $0<h$. In such embodiments of the method, a surface of the sacrificial 3D design may be defined by revolving the curve around the axis. Further, in such embodiments of the method, each slice of the sacrificial 3D design has an area less than 100 $cm^2$.

In another embodiment, an additive manufacturing method includes forming a desired article and a sacrificial article by: (a) forming a layer of the desired article; (b) while forming the layer of the desired article, forming a layer of the sacrificial article; and repeating steps (a) and (b) until all layers of the desired article and sacrificial article are formed; wherein the sacrificial article has a linear change in cross-sectional area in the Y-direction.

In certain embodiments of the method, the sacrificial article is formed with a curve of coordinates (x,y) according to the formula: $x*A=\pi*[(y-h)/m]^2$ wherein: $0<x<1$; A is a hemispherical cross sectional area and $0<A$; m is a slope and $m<0$; and h is height and $0<h$. In such embodiments, a surface of the sacrificial article may be defined by revolving the curve around the Z-axis.

In certain embodiments of the method, the sacrificial article is tessellated.

In certain embodiments of the method, each respective layer of the sacrificial article has an area of from 0.2 $cm^2$ to 100 $cm^2$.

In certain embodiments of the method, a plurality of desired articles and a plurality of sacrificial articles are formed simultaneously, and only the plurality of desired articles and a plurality of sacrificial articles are formed.

In certain embodiments of the method, the sacrificial article is a first sacrificial article; the method further includes (c) while forming the layer of the desired article and the layer of the first sacrificial article, forming a layer of a second sacrificial article; and steps (a), (b) and (c) are repeated until all layers of the desired article, the first sacrificial article, and the second sacrificial article are formed. In such embodiments, a plurality of desired articles, a plurality of first sacrificial articles, and a plurality of second sacrificial articles are formed simultaneously, and only the plurality of desired articles, the plurality of first sacrificial articles, and the plurality of second sacrificial articles are formed.

A system for additive manufacturing includes a memory; and a processor configured to: calculate a slice area distribution of a desired 3D design including slice areas of slices of the desired 3D design corresponding to parallel planes along an axis, wherein the slices of the desired 3D design have an initial slice area differential; obtain a slice area distribution of a sacrificial 3D design including slice areas of slices of the sacrificial 3D design corresponding to the parallel planes; plan a 3D layout of the desired 3D design and of the sacrificial 3D design, wherein at each respective parallel plane in the 3D layout a total slice area includes a respective slice area of the desired 3D design and a respective slice area of the sacrificial 3D design, and wherein the 3D layout has a total slice area differential that is less than the initial slice area differential; and generate instructions for printing slices of the desired 3D design and the sacrificial 3D design according to the 3D layout.

In certain embodiments, the system further includes an additive manufacturing apparatus, wherein the processor is configured to communicate the instructions to the additive manufacturing apparatus; and wherein the additive manufacturing apparatus is configured to print slices of the desired 3D design and the sacrificial 3D design according to the 3D layout to form the desired 3D design and the sacrificial 3D design.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising", but in certain embodiments may mean "consisting of". In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

Systems and methods disclosed herein include techniques for building parts or articles (also, "objects" or "products") by additive manufacturing (AM), in particular, determining scanning strategies for cross-sectional layers of a build, based on information about the build material, additive manufacturing apparatus, and desired or intended features of the desired article.

Though some embodiments described herein are described with respect to certain additive manufacturing techniques using certain building materials (e.g., polymers), the described system and methods may also be used with certain other additive manufacturing techniques and/or certain other building materials as would be understood by one of skill in the art.

Embodiments herein are related to additive manufacturing processes, such as Multi Jet Fusion (MJF) and Selective Laser Sintering (SLS). In such processes, articles are built incrementally layer-by-layer. These processes should maintain as consistent of a printed or sintered volume as possible on each layer to ensure good part quality. Embodiments herein provide for equalizing the sintered volume on each printed layer, greatly improving part characteristics.

For example, embodiments herein improve printing articles of a desired 3D design by adding at least one sacrificial 3D design to the printing layout. An exemplary sacrificial 3D design is standardized for use in multiple printing processes. Standardization allows for the sacrificial 3D design geometry to be automatically added to builds in software. Furthermore, the standardization ensures that the build will not experience unexpected issues due to the addition of the sacrificial 3D design.

In exemplary embodiments, the sacrificial 3D design has a linear change in cross-sectional area achieved through the unique design. A linear change in area allows for perfect slice normalization because 'sudden' peaks in cross sectional area can be eliminated during design. Furthermore, the design can be 'tiled' in the Z-direction to achieve zero peaks in the slice distribution. The resulting smooth ramp in cross-sectional allows for precise control during build packing and optimal processing conditions in the printer.

In exemplary embodiments, the sacrificial 3D design is small, such that each slice area of the sacrificial 3D design is less than 100 $cm^2$. The small size of the sacrificial 3D design allows for integration of the sacrificial 3D design into a variety of build layouts. Further, the small size allows for very fine tuning to be done on each print. Also, their small size allows for the sacrificial 3D design to be packed into virtually any build. Moreover, the small size minimizes printed cross sectional area, which reduces the chance for build failure or part warpages.

Due to the simplicity of the sacrificial 3D design, duplicating the design to the factor of a few hundred, such as for a single printing process, does not result in a software file size that is unwieldy and difficult for a computer to work with. The simple design of the sacrificial 3D design described herein creates a low poly-count STL that takes very little computer power to utilize.

Figure 1:
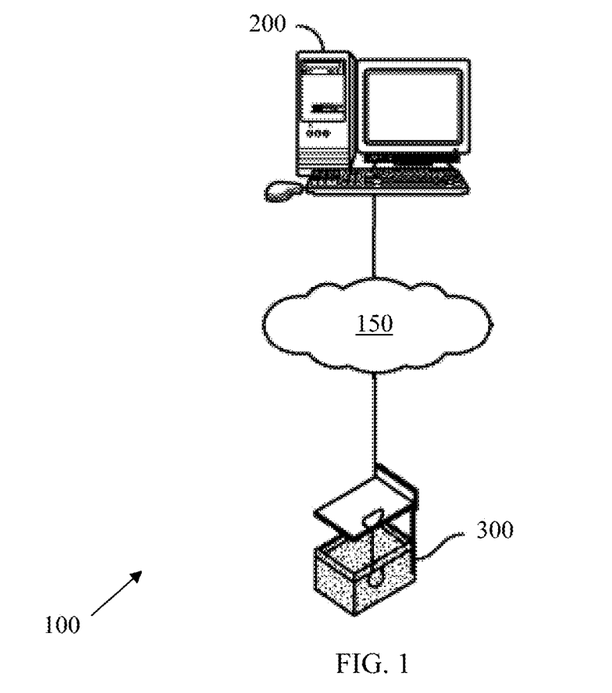
FIG. 1 is a schematic of a system for additive manufacturing in accordance with an embodiment.

Embodiments may be practiced within a system for designing and manufacturing 3D objects. Turning to FIG. 1, an example of a computer environment suitable for the implementation of 3D object design and manufacturing is shown. The environment includes a system 100. The system 100 includes one or more computers or computing devices 200 which can be, for example, any workstation, server, or other computing device capable of processing information. In some embodiments, each of the computers 200 can be connected, by any suitable communications technology (e.g., an internet protocol), to a network 150 (e.g., the Internet). Accordingly, the computers 200 may transmit and receive information (e.g., software, digital representations of 3-D objects, commands or instructions to operate an additive manufacturing device, etc.) between each other via the network 150.

The system 100 further includes one or more additive manufacturing devices (e.g., 3-D printers) 300. An additive manufacturing device 300 may be directly connected to a computer 200 or connected to a computer 200 via the network 150.

It should be noted that though the system 100 is described with respect to a network and one or more computers, the techniques described herein also apply to a single computer 200, which may be directly connected to an additive manufacturing device 300.

Figure 2:
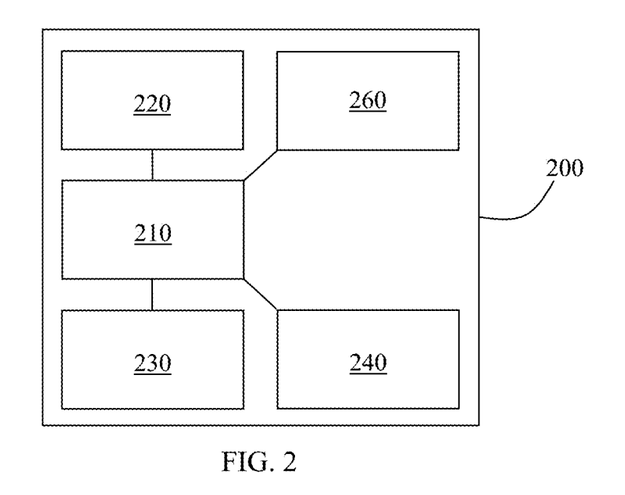
FIG. 2 illustrates a functional block diagram of the computer in the system of FIG. 1, in accordance with an embodiment.

FIG. 2 illustrates a functional block diagram of one example of a computer 200 of FIG. 1. The computer 200 includes a processor 210 in data communication with a memory 220, an input device 230, and an output device 240. In some embodiments, the processor is further in data communication with an optional network interface card 260. Although described separately, it is to be appreciated that functional blocks described with respect to the computer 200 need not be separate structural elements. For example, the processor 210 and memory 220 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 also may be coupled to an input device 230 and an output device 240 for, respectively, receiving input from and providing output to a user of the computer 200. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 210 further may be coupled to a network interface card 260. The network interface card 260 prepares data generated by the processor 210 for transmission via a network according to one or more data transmission protocols. The network interface card 260 also decodes data received via a network according to one or more data transmission protocols. The network interface card 260 can include a transmitter, receiver, or both. In other embodiments, the transmitter and receiver can be two separate components. The network interface card 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
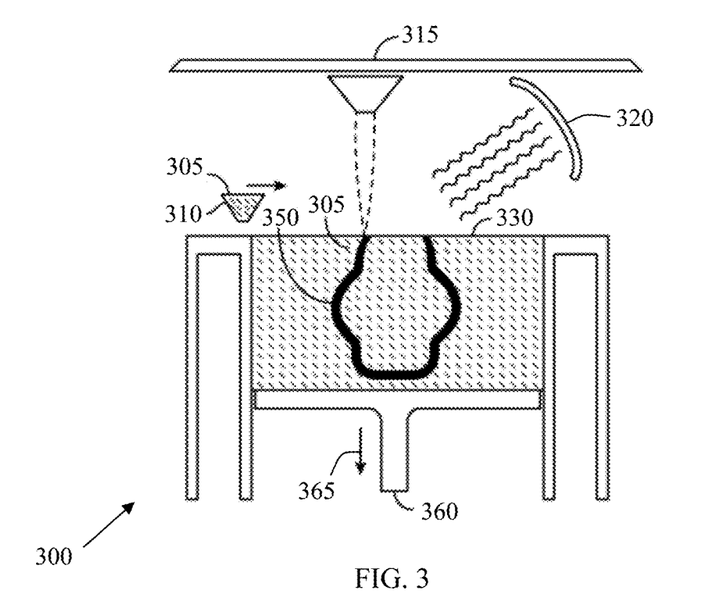
FIG. 3 is a schematic of the additive manufacturing apparatus in the system of FIG. 1, in accordance with an embodiment.

FIG. 3 illustrates an exemplary additive manufacturing apparatus 300 for generating a three-dimensional (3-D) object. In this example, the additive manufacturing apparatus 300 is a laser sintering device. The laser sintering device 300 may be used to generate one or more 3D objects layer by layer. The laser sintering device 300, for example, may utilize a powder (e.g., polymer, metal, etc.), such as the powder 305, to build an object a layer at a time as part of a build process.

Successive powder layers are spread on top of each other using, for example, a recoating mechanism 310 (e.g., a recoater blade). The recoating mechanism 310 deposits powder for a layer as it moves across the build area, for example in the direction shown, or in the opposite direction if the recoating mechanism 310 is starting from the other side of the build area, such as for another layer of the build. In some other embodiments, the recoating mechanism 310 may be a leveling drum/roller rather than the recoating mechanism 310 illustrated in FIG. 3. In such an embodiment, the powder may be distributed using one or more moveable pistons (not shown).

After deposition of fresh powder, a computer-controlled $CO_2$ laser beam scans the surface and selectively binds together the powder particles of the corresponding cross section of the product. In some embodiments, the laser scanning device 315 is an X-Y moveable infrared laser source. As such, the laser source can be moved along an X axis and along a Y axis in order to direct its beam to a specific location of the top most layer of powder. Alternatively, in some embodiments, the laser scanning device 315 may comprise a laser scanner which receives a laser beam from a stationary laser source, and deflects it over moveable mirrors to direct the beam to a specified location in the working area of the device. During laser exposure, the powder temperature rises above the material (e.g., glass, polymer, metal) transition point after which adjacent particles flow together to create the 3D object. The device 300 may also optionally include a radiation heater (e.g., an infrared lamp) and/or atmosphere control device 320. The radiation heater may be used to preheat the powder between the recoating of a new powder layer and the scanning of that layer. In some embodiments, the radiation heater may be omitted. The atmosphere control device may be used throughout the process to avoid undesired scenarios such as, for example, powder oxidation.

As shown, powder 305 is held in a reservoir 330 in which the desired article 350 is formed. The depth of the reservoir, in turn, is also controlled by a moveable piston 360, which increases the depth of the reservoir 330 via downward movement in the direction of the Z-axis indicated by the arrow 365 as additional powder is added over the reservoir 330. After a layer is printed by the laser beam, the piston moves incrementally downward and a new layer of powder is deposited over the just printed layer.

As described below, in embodiments herein at least one coupon or sacrificial article is printed along with the desired article or articles 350 shown in FIG. 3. The sacrificial article is merely produced to improve the compositional and/or aesthetic quality of the desired article(s) 350. Thus, the sacrificial article may be disposed of as waste or recycled. In exemplary embodiments, the sacrificial article has no functional or aesthetic value outside of improving the quality of the desired article(s) 350 during the additive manufacturing process.

Figure 4:
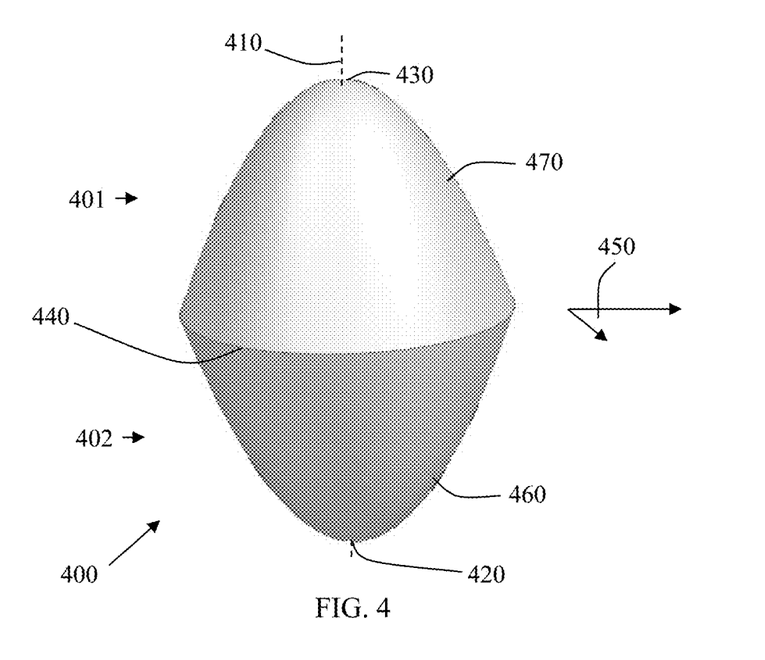
FIG. 4 is a perspective view of a sacrificial article for manufacture by the system of FIG. 1, in accordance with an embodiment.

An exemplary coupon or sacrificial article 400 is illustrated in FIG. 4. An exemplary sacrificial article 400 has an upper portion or half 401 and a lower portion or half 402 that are mirror images of one another. As shown the sacrificial article 400 extends along an axis 410, such as a vertical axis (or the Z-axis in the context of the additive manufacturing apparatus 300) from a bottom end 420 to a top end 430. As shown the upper portion 401 and lower portion 402 meet at and contact one another at a hemisphere 440 along a plane 450 perpendicular to the axis 410. In exemplary embodiments, the hemisphere 440 is circular. Further, the exemplary sacrificial article 400 is solid, i.e., is not hollow.

The exemplary sacrificial article 400 has an outer surface 460. In exemplary embodiments, the outer surface 460 of each half 401 and 402, is defined with a shape created by rotating a curve 470 about the axis 410.

Figure 5:
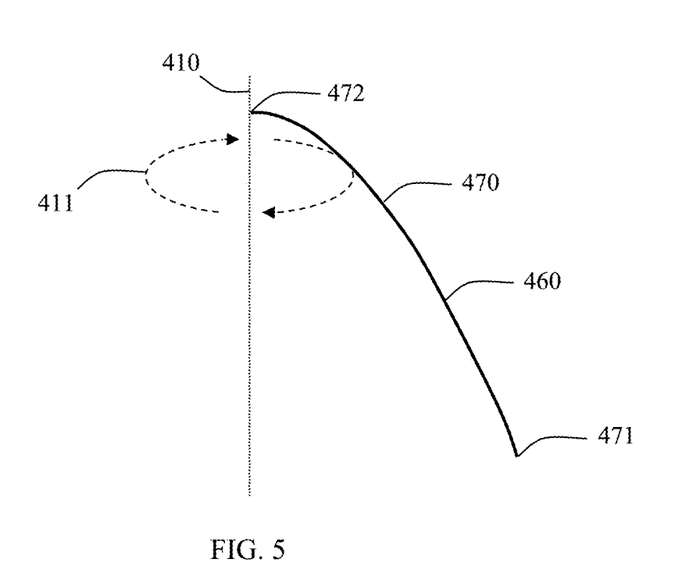
FIG. 5 is a graphical representation of the curve used to design the design of the sacrificial article of FIG. 4, in accordance with an embodiment.

FIG. 5 illustrates curve 470 and may be considered to be a longitudinal cross section of the surface 460 of a portion of the upper half 401 of the sacrificial article 400, taken along a plane defined by the x-axis and the z-axis. As shown, the curve 470 extends from midpoint 471 to endpoint 472. Cross-referencing FIGS. 4 and 5, it may be seen that the curve 470 may be revolved about the axis 410 in the direction of arrows 411 to form the surface 470 of the upper half 401 of sacrificial article 400. To form lower half 402, curve 470 may be inverted and revolved about the axis 410 in the direction of arrows 411.

In exemplary embodiments, each half 401 and 402 of the sacrificial article 400 is formed with a surface defined by a curve of coordinates (x,y) according to the formula:

$$x*A=\pi*[(y-h)/m]^2$$

wherein: 0<x<1; A is a hemispherical cross sectional area and 0<A; m is a slope and m<0; and h is height and 0<h.

In exemplary embodiments, each respective slice or layer of the sacrificial article has an area less than 100 cm$^2$, such as from 0.2 cm$^2$ to 100 cm$^2$.

In exemplary embodiments, the sacrificial article is tessellated.

In exemplary embodiments, the sacrificial article has a linear change in cross-sectional area in the Y-direction. Specifically, the cross-sectional area of slices of the sacrificial article increases linearly from either bottom end 420 or top end 430 to the hemisphere 440.

Figure 6:
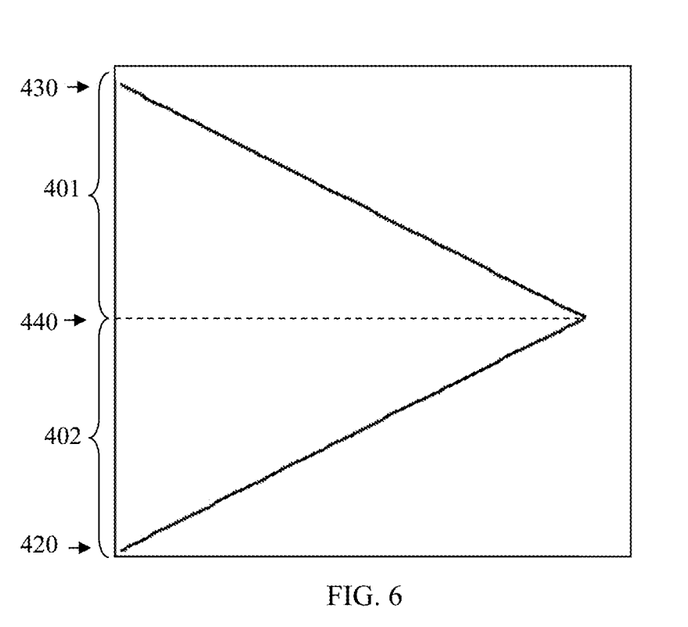
FIG. 6 is a slice area distribution graph of the sacrificial article of FIG. 4, in accordance with an embodiment.

Referring to FIG. 6, a slice distribution graph for the cross-sectional area of the sacrificial article 400 is plotted on the X-axis at slice heights, or Z-axis value, plotted on the Y-axis. For example, the bottom end 420 is at a height of 0%, the top end 430 is at a height of 100%, and the hemisphere 440 is at a height of 50% of the total height of the sacrificial article 400. In an exemplary embodiment, 171 slices are represented along the Z-axis, though any suitable number may be used given the height of the sacrificial article 400. As shown in the graph of FIG. 6, the cross-sectional area at the bottom end 420 is zero, the cross-sectional area at the top end 430 is zero, and the cross-sectional area at the hemisphere 440 is at a maximum value. In an exemplary embodiment, the maximum value is 2 square centimeters, though the sacrificial article 400 may be designed with any desired maximum value for slice area. As shown, the change in cross-sectional area for each slice of the sacrificial article increases linearly from the first slice at bottom end 420 to the hemisphere 440 and decreases linearly from the hemisphere 440 to the 171$^{st}$ slice at top end 430.

Figure 7:
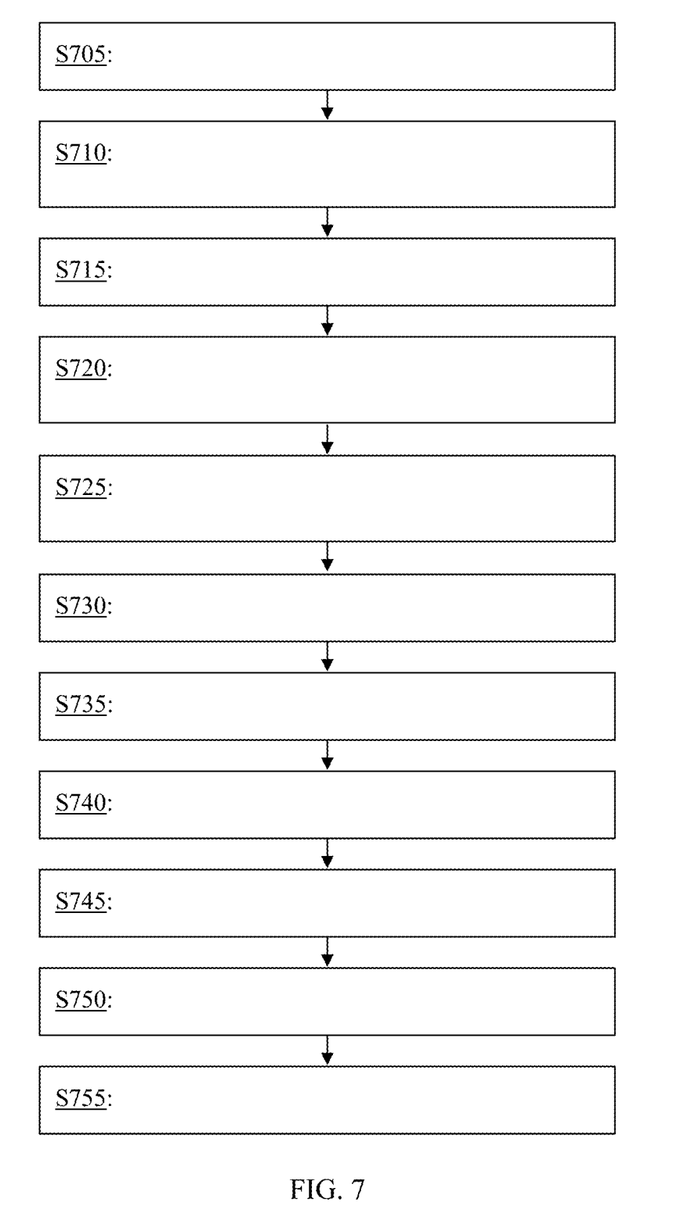
FIG. 7 is a flow chart illustrating an additive manufacturing method, in accordance with an embodiment.

FIG. 7 provides a flow chart of an additive manufacturing method 700. As shown, method 700 includes operation S705, which includes obtaining, such as on the computing device 200, at least one sacrificial three-dimensional (3D) design. In an exemplary embodiment, the sacrificial 3D design has a linear change in cross-sectional area, such as the sacrificial article 400. In an exemplary embodiment, the sacrificial 3D design is prepared and saved in the memory 220 and may be retrieved when the additive manufacturing method 700 is commenced. Alternatively, the sacrificial 3D design is created when the additive manufacturing method 700 is commenced.

In certain embodiments, a plurality of sacrificial 3D designs are obtained, whether stored ahead of time or created when the method 700 commences. For example, sacrificial 3D designs of different sizes, such as with different maximum cross-sectional areas in planes perpendicular to the Z-axis and/or with different heights in the Z-direction.

Method 700 may further include obtaining, such as on the computing device 200, a slice area distribution of each sacrificial 3D design at operation S710. Each slice area distribution includes slice areas of slices of the respective sacrificial 3D design corresponding to selected parallel planes that are perpendicular to the Z-axis. In an exemplary embodiment, the selected parallel planes are separated by gaps of a selected constant distance. For example, the constant distance may be 150 microns.

In an exemplary embodiment, the slice area distribution of each sacrificial 3D design is prepared and saved in the memory 220 and may be retrieved when the additive manufacturing method 700 is commenced. Alternatively, the slice area distribution of each sacrificial 3D design may be determined when the additive manufacturing method 700 is commenced.

In certain embodiments, a "slice area differential" means an aggregate difference in slice area between adjacent slices. For example, a sacrificial 3D design including a total of five slices having slice areas of 5 $cm^2$, 10 $cm^2$, 15 $cm^2$, 10 $cm^2$, and 5 $cm^2$ has four inter-slice differences of 5 $cm^2$ each for an aggregate slice area differential of 20 $cm^2$ and an average slice area differential of 5 $cm^2$.

As shown in FIG. 7, method 700 also includes obtaining, such as on the computing device 200, at least one desired three-dimensional (3D) design at operation S715. In certain embodiments, each desired 3D design is prepared and saved in the memory 220 and may be retrieved when the additive manufacturing method 700 is commenced. Alternatively, each desired 3D design is created or otherwise obtained when the additive manufacturing method 700 is commenced. For example, the desired 3D design may be inputted into the computing device 200 at input device 230.

At operation S720, the method 700 includes calculating, such as on the computing device 200, a slice area distribution of each desired 3D design at operation S720. Each slice area distribution includes slice areas of slices of the respective desired 3D design corresponding to the selected parallel planes that are perpendicular to the Z-axis. Further, the slices of each desired 3D design have an initial slice area differential.

As indicated above, a "slice area differential" can be interpreted to mean an aggregate difference in slice area between adjacent slices. For example, a desired 3D design including a total of five slices having slice areas of 20 $cm^2$, 10 $cm^2$, 2 $cm^2$, 10 $cm^2$, and 20 $cm^2$ has four inter-slice differences of 10 $cm^2$, 8 $cm^2$, 8 $cm^2$, and 10 $cm^2$ for an aggregate slice area differential of 36 $cm^2$ and an average slice area differential of 9 $cm^2$.

In an exemplary embodiment, the slice area distribution of each desired 3D design is prepared and saved in the memory 220 and may be retrieved when the additive manufacturing method 700 is commenced. Alternatively, the slice area distribution of each desired 3D design may be determined when the additive manufacturing method 700 is commenced.

At operation S725, method 700 includes planning, such as on the computing device 200, a 3D layout of the desired 3D design and of the sacrificial 3D design, wherein at each respective parallel plane in the 3D layout a total slice area includes a respective slice area of the desired 3D design and a respective slice area of the sacrificial 3D design, and wherein the 3D layout has a total slice area differential that is less than the initial slice area differential.

The total slice area differential may be calculated by comparing the each layer's combined slice areas, wherein each combined slice area is the sum of slice areas in the layer.

In a simple combination of one article of the desired 3D design above, including a total of five slices having slice areas of 20 $cm^2$, 10 $cm^2$, 2 $cm^2$, 10 $cm^2$, and 20 $cm^2$, and one article of the sacrificial 3D design above, including a total of five slices having slice areas of 5 $cm^2$, 10 $cm^2$, 15 $cm^2$, 10 $cm^2$, and 5 $cm^2$, the total slice area differential is reduced.

Specifically, the five layers including both designs have combined slice areas of 25 $cm^2$, 20 $cm^2$, 17 $cm^2$, 20 $cm^2$, and 25 $cm^2$, with four inter-slice differences of 5 $cm^2$, 3 $cm^2$, 3 $cm^2$, and 5 $cm^2$ for an aggregate slice area differential of 16 $cm^2$ and an average slice area differential of 4 $cm^2$.

While this simple example lays out the two designs with same heights and in vertical alignment, it is contemplated that the designs may be vertically staggered or tiled in the Z-direction in practice.

In exemplary embodiments, the sacrificial 3D design is a standardized design used repeatedly for every new desired 3D design. In other exemplary embodiments, the sacrificial 3D design is selected from a library of sacrificial 3D designs.

In certain embodiments, the layout includes only a single desired 3D design and a single sacrificial 3D design. For example, the layout may include a desired number of desired articles, all having the same desired 3D design. Further, the layout may include a determined number of sacrificial articles, all having the same sacrificial 3D design.

In other embodiments, the layout includes only a single desired 3D design and a two different sacrificial 3D designs. For example, the layout may include a desired number of desired articles, all having the same desired 3D design. Further, the layout may include a determined number of first sacrificial articles having a same first sacrificial 3D design and a determined number of second sacrificial articles having a same second sacrificial 3D design.

It is contemplated that certain embodiments may use other numbers of sacrificial 3D designs, though generally minimizing the number of sacrificial 3D designs may simplify planning and production.

In embodiments with multiple sacrificial 3D designs, operation S725 includes planning the 3D layout of the desired 3D design and of each sacrificial 3D design, and the total slice area includes a respective slice area of the desired 3D design and of respective slice areas of each sacrificial 3D design.

As shown in FIG. 7, method 700 also includes generating instructions, such as with the computing device 200, for printing slices of the desired 3D design and the sacrificial 3D design according to the 3D layout at operation S730.

Further, method 700 may include, at operation S735, communicating the instructions from the computing device to an additive manufacturing apparatus.

Also, method 700 may include, at operation S740, printing slices of the desired 3D design and the sacrificial 3D design according to the 3D layout to form articles of the desired 3D design and the sacrificial 3D design.

After printing is completed, method 700 may include, at operation S745, removing the articles of the desired 3D design and the sacrificial 3D design from the additive manufacturing apparatus.

Method 700 may include further processing of the articles of the desired 3D design at operation S750 and disposing of or recycling articles of the sacrificial 3D design at operation S755.

Figure 8:
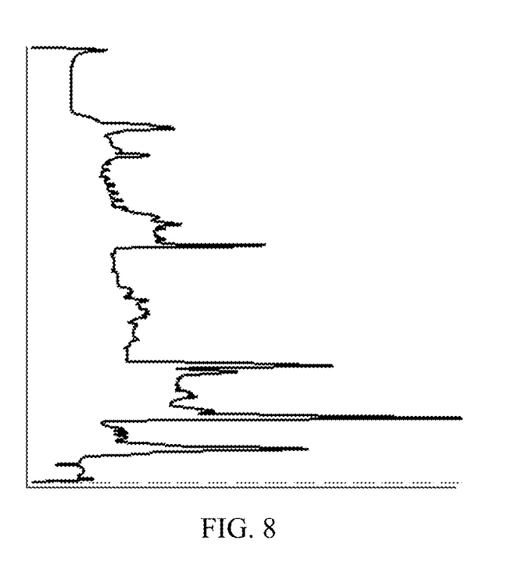
FIG. 8 is a slice area distribution graph for an exemplary desired 3D design, in accordance with an embodiment.
Figure 9:
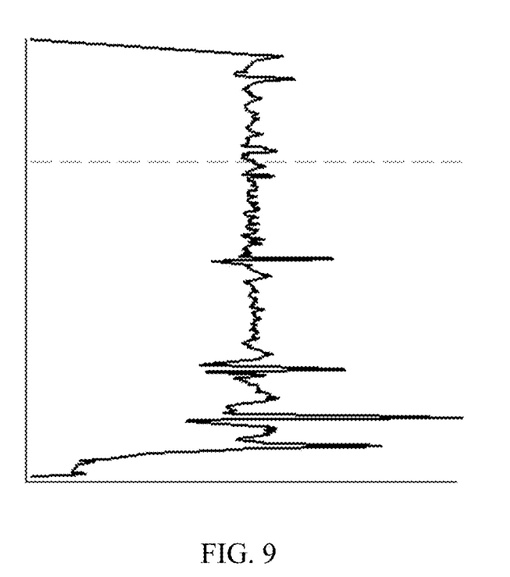
FIG. 9 is a slice area distribution graph for a layout including the desired 3D design of FIG. 8 and the sacrificial 3D design of FIG. 9, in accordance with an embodiment.

FIGS. 8-9 illustrate the reduction in slice differential provided by including the sacrificial 3D design in the layout with the desired 3D design. FIG. 8 is a slice distribution graph of an exemplary desired 3D design. FIG. 9 is a slice distribution graph of a layout including the desired 3D design and the sacrificial 3D design (such as provided in FIG. 6).

The slice distribution graphs each illustrate cross-sectional area on the X-axis at the layer level or slice heights, or Z-axis value, plotted on the Y-axis. In FIG. 8, 2044 slices correspond to the exemplary desired 3D design. For the exemplary desired 3D design, the maximum cross-sectional area is about 53 square centimeters. As shown, there is a large inter-slice delta, i.e., the cross-sectional areas of adjacent slices vary greatly.

During processing, a layout adds a plurality of sacrificial 3D designs to the desired 3D design to reduce inter-slice changes in area, i.e., to smooth the slice distribution graph.

In FIG. 9, 2231 slices correspond to the layout including the exemplary desired 3D design and the sacrificial 3D designs. For the layout, the maximum cross-sectional area is about 61 square centimeters.

As can be seen by comparing FIG. 8 and FIG. 9, the slice area distribution is evened out by including the sacrificial 3D designs in the layout of FIG. 9 as compared to the initial layout of FIG. 8, i.e., the magnitude of valleys and peaks is reduced to provide a smoother change between adjacent slices during printing. Further, inclusions of the plurality of sacrificial 3D designs in the layout provides for a smooth ramp up and ramp down at the bottom and top ends. In summary, the layout has improved slice consistency as compared to the initial design.

Because the difference in the slice area of adjacent slices is reduced, the time duration of laser operation on each layer is more equalized and heating and cooling of layers is more normalized. As a result, quality of the printed articles is improved, including surface finish improvement and structural improvement.

Figure 10:
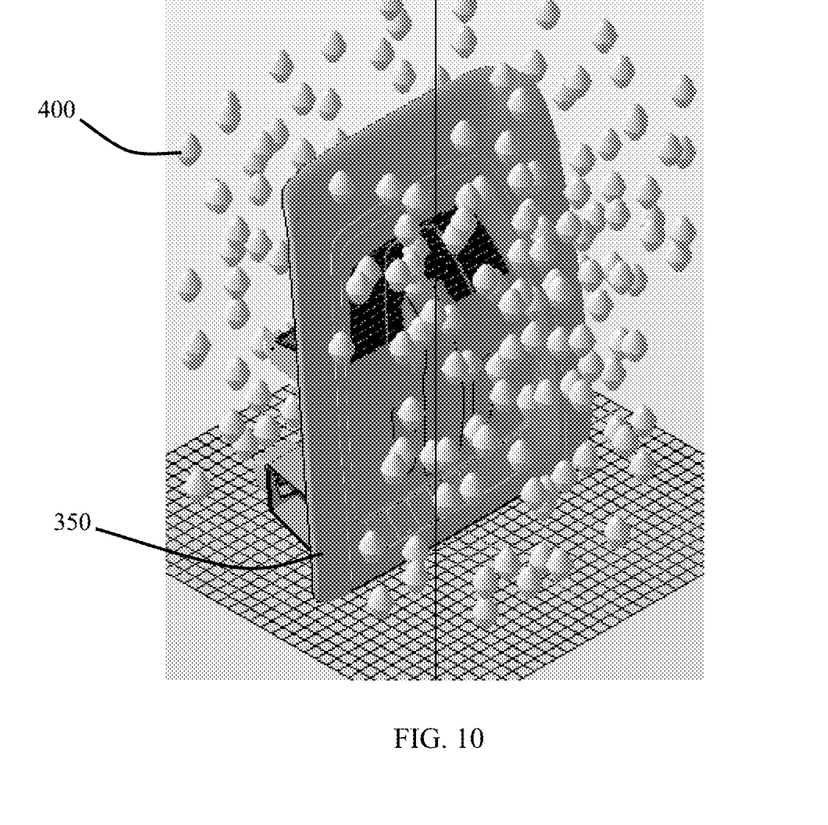
FIG. 10 is a perspective view of a layout including the desired 3D design of FIG. 8 and a plurality of sacrificial 3D designs as determined by the slice area distribution graph of FIG. 9, in accordance with an embodiment.

FIG. 10 provides a perspective view of the layout graphed in FIG. 9, illustrating positioning of the desired 3D design for desired article 350 and the plurality of sacrificial 3D designs of sacrificial articles 400.

Articles 350 of the desired 3D design may form an automotive vehicle component. Therefore, in an embodiment herein a vehicle is provided and includes an additive manufactured article printed according to methods herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for additive manufacturing, the method comprising:

calculating, on a computing device, a slice area distribution of a desired three-dimensional (3D) design comprising slice areas of slices of the desired 3D design corresponding to parallel planes along an axis, wherein the slices of the desired 3D design have an initial slice area differential;

obtaining, on the computing device, a slice area distribution of a sacrificial 3D design comprising slice areas of slices of the sacrificial 3D design corresponding to the parallel planes, wherein the sacrificial 3D design is formed with a curve defined by coordinates (x,y) according to the formula:

$$x*A = x*[(y-h)/m]^2$$

wherein:

$0<x<1$;

A is a hemispherical cross sectional area and $0<A$;

m is a slope and $m<0$; and h is height and $0<h$;

planning, on the computing device, a 3D layout of the desired 3D design and of the sacrificial 3D design, wherein at each respective parallel plane in the 3D layout a total slice area includes a respective slice area of the desired 3D design and a respective slice area of the sacrificial 3D design, and wherein the 3D layout has a total slice area differential that is less than the initial slice area differential;

generating instructions, with the computing device, for printing slices of the desired 3D design and the sacrificial 3D design according to the 3D layout;

communicating the instructions from the computing device to an additive manufacturing apparatus; and printing slices of the desired 3D design and the sacrificial 3D design according to the 3D layout to form the desired 3D design and the sacrificial 3D design.

2. The method of claim 1, wherein the 3D layout includes a plurality of articles with the desired 3D design and a plurality of articles with the sacrificial 3D design.

3. The method of claim 1, wherein the 3D layout consists of a plurality of articles with the desired 3D design and a plurality of articles with the sacrificial 3D design.

4. The method of claim 1, wherein:

the sacrificial 3D design is a first sacrificial 3D design;

the method further comprises obtaining, on the computing device, a slice area distribution of a second sacrificial 3D design comprising slice areas of slices of the second sacrificial 3D design corresponding to the parallel planes; and planning the 3D layout comprises planning the 3D layout of the desired 3D design, of the first sacrificial 3D design, and of the second sacrificial 3D design, wherein at each respective parallel plane in the 3D layout a total slice area includes a respective slice area of the desired 3D design, a respective slice area of the first sacrificial 3D design, and a respective slice area of the second sacrificial 3D design.

5. The method of claim 4, wherein the 3D layout consists of a plurality of articles with the desired 3D design, a plurality of articles with the first sacrificial 3D design, and a plurality of articles with the second sacrificial 3D design.

6. The method of claim 1, wherein the sacrificial 3D design has a linear change in slice areas between adjacent slices.

7. The method of claim 1, wherein a surface of the sacrificial 3D design is defined by revolving the curve around the axis.

8. The method of claim 1, wherein each slice of the sacrificial 3D design has an area less than 100 cm².

9. An additive manufacturing method comprising:
forming a desired article and a sacrificial article by:
(a) forming a layer of the desired article;
(b) while forming the layer of the desired article, forming a layer of the sacrificial article; and
repeating steps (a) and (b) until all layers of the desired article and sacrificial article are formed;
wherein the sacrificial article has a linear change in cross-sectional area in the Y-direction; and
wherein the sacrificial article is formed with a curve of coordinates (x,y) according to the formula:

$$x*A=x*[(y-h)/m]^2$$

wherein:
0<x<1;
A is a hemispherical cross sectional area and 0<A;
m is a slope and m<0; and
h is height and 0<h.

10. The additive manufacturing method of claim 9, wherein a surface of the sacrificial article is defined by revolving the curve around the Z-axis.

11. The additive manufacturing method of claim 9, wherein the sacrificial article is tessellated.

12. The additive manufacturing method of claim 9, wherein each respective layer of the sacrificial article has an area of from 0.2 cm² to 100 cm².

13. The additive manufacturing method of claim 9, wherein a plurality of desired articles and a plurality of sacrificial articles are formed simultaneously, and wherein only the plurality of desired articles and a plurality of sacrificial articles are formed.

14. The additive manufacturing method of claim 9, wherein:
the sacrificial article is a first sacrificial article;
the method further comprises (c) while forming the layer of the desired article and the layer of the first sacrificial article, forming a layer of a second sacrificial article; and steps (a), (b) and (c) are repeated until all layers of the desired article, the first sacrificial article, and the second sacrificial article are formed.

15. The additive manufacturing method of claim 14, wherein a plurality of desired articles, a plurality of first sacrificial articles, and a plurality of second sacrificial articles are formed simultaneously, and wherein only the plurality of desired articles, the plurality of first sacrificial articles, and the plurality of second sacrificial articles are formed.

16. A system for additive manufacturing, the system comprising: an additive manufacturing apparatus, a memory; and a processor configured to:
calculate a slice area distribution of a desired 3D design comprising slice areas of slices of the desired 3D design corresponding to parallel planes along an axis, wherein the slices of the desired 3D design have an initial slice area differential;
obtain a slice area distribution of a sacrificial 3D design comprising slice areas of slices of the sacrificial 3D design corresponding to the parallel planes, wherein the sacrificial 3D design is formed with a curve defined by coordinates (x,y) according to the formula:

$$x*A=*[(y-h)/m]^2$$

wherein:
0<x<1;
A is a hemispherical cross sectional area and 0<A;
m is a slope and m<0; and
h is height and 0<h;
plan a 3D layout of the desired 3D design and of the sacrificial 3D design, wherein at each respective parallel plane in the 3D layout a total slice area includes a respective slice area of the desired 3D design and a respective slice area of the sacrificial 3D design, and wherein the 3D layout has a total slice area differential that is less than the initial slice area differential; and
generate instructions for printing slices of the desired 3D design and the sacrificial 3D design according to the 3D layout; and
communicate the instructions to the additive manufacturing apparatus;
wherein the additive manufacturing apparatus is configured to print slices of the desired 3D design and the sacrificial 3D design according to the 3D layout to form the desired 3D design and the sacrificial 3D design.

* * * * *